United States Patent
Wang et al.

(10) Patent No.: US 12,519,747 B2
(45) Date of Patent: Jan. 6, 2026

(54) METHOD, ELECTRONIC DEVICE, AND STORAGE MEDIUM FOR PERFORMING A RESPONSE PROCESS BASED ON RESPONSE MESSAGES

(71) Applicant: Beijing Youzhuju Network Technology Co., Ltd., Beijing (CN)

(72) Inventors: Qing Wang, Beijing (CN); Jian Wang, Beijing (CN)

(73) Assignee: Beijing Youzhuju Network Technology Co., Ltd., Beijing (CN)

( * ) Notice: Subject to any disclaimer, the term of this patent is extended or adjusted under 35 U.S.C. 154(b) by 0 days.

(21) Appl. No.: 19/071,081

(22) Filed: Mar. 5, 2025

(65) Prior Publication Data

US 2025/0247357 A1 Jul. 31, 2025

Related U.S. Application Data

(63) Continuation of application No. PCT/CN2024/071802, filed on Jan. 11, 2024.

(30) Foreign Application Priority Data

Jan. 17, 2023 (CN) .......................... 202310087687.6

(51) Int. Cl.
*H04L 61/4511* (2022.01)
*H04L 67/60* (2022.01)

(52) U.S. Cl.
CPC .......... *H04L 61/4511* (2022.05); *H04L 67/60* (2022.05)

(58) Field of Classification Search
CPC .............................. H04L 61/4511; H04L 67/60
See application file for complete search history.

(56) References Cited

U.S. PATENT DOCUMENTS 7,454,500 B1 * 11/2008 Hsu ...................... H04L 67/1001
                                                              709/226
7,814,229 B1 * 10/2010 Cabrera .............. H04L 61/4511
                                                              709/228
(Continued)

FOREIGN PATENT DOCUMENTS

CN           1414761 A       4/2003
CN         102480477 A       5/2012
(Continued)

OTHER PUBLICATIONS

Kaur, Sukhveer, et al. "Round-robin based load balancing in Software Defined Networking." 2015 2nd international conference on computing for sustainable global development (INDIACom). IEEE, 2015.*

(Continued)

*Primary Examiner* — Jimmy H Tran
(74) *Attorney, Agent, or Firm* — BakerHostetler

(57) ABSTRACT

Provided in the present application are a data message response method and apparatus, an electronic device and a storage medium. The method comprises: receiving request information, and searching for a plurality of response messages corresponding to the request information; and according to the plurality of response messages, executing a response process. The response process comprises: determining whether the data volume of the plurality of response messages is greater than a first threshold value; and when determining that the data volume of the plurality of response messages is greater than the first threshold value, using round-robin algorithm to select, in the manner of round robin, from the plurality of response messages a first predetermined number of target response messages for response, the first predetermined number being less than the total number of the response messages.

20 Claims, 4 Drawing Sheets

(56) References Cited

U.S. PATENT DOCUMENTS

| | | | | |
|---|---|---|---|---|
| 8,261,351 | B1* | 9/2012 | Thornewell | H04L 61/4511 |
| | | | | 713/153 |
| 8,683,075 | B1* | 3/2014 | Joffe | H04L 67/1001 |
| | | | | 709/238 |
| 9,276,902 | B2* | 3/2016 | Treuhaft | H04L 61/35 |
| 10,033,692 | B1* | 7/2018 | Vavrusa | H04L 61/59 |
| 10,616,318 | B1* | 4/2020 | Katey | H04L 67/1017 |
| 10,992,494 | B2* | 4/2021 | Huapeng | H04L 12/2825 |
| 11,128,597 | B1* | 9/2021 | Johnson | H04L 9/0643 |
| 11,303,606 | B1* | 4/2022 | Chew | H04L 61/4511 |
| 11,570,278 | B1* | 1/2023 | Uthaman | H04L 41/0894 |
| 11,641,410 | B1* | 5/2023 | Uthaman | H04L 43/50 |
| | | | | 709/218 |
| 11,892,997 | B1* | 2/2024 | Uthaman | H04L 61/4511 |
| 2002/0009079 | A1* | 1/2002 | Jungck | H04L 47/10 |
| | | | | 370/386 |
| 2002/0087722 | A1* | 7/2002 | Datta | H04L 61/30 |
| | | | | 709/239 |
| 2004/0078487 | A1* | 4/2004 | Cernohous | H04L 67/1017 |
| | | | | 707/999.002 |
| 2005/0044234 | A1* | 2/2005 | Coughlin | H04L 61/4511 |
| | | | | 709/227 |
| 2006/0029038 | A1* | 2/2006 | Jungck | H04L 63/0263 |
| | | | | 370/398 |
| 2006/0029104 | A1* | 2/2006 | Jungck | H04L 61/4511 |
| | | | | 370/351 |
| 2006/0075139 | A1* | 4/2006 | Jungck | H04L 67/1038 |
| | | | | 709/245 |
| 2006/0235972 | A1* | 10/2006 | Asnis | H04L 67/1017 |
| | | | | 709/225 |
| 2009/0122766 | A1* | 5/2009 | Hughes | H04L 45/122 |
| | | | | 370/336 |
| 2009/0262741 | A1* | 10/2009 | Jungck | H04L 41/5054 |
| | | | | 370/392 |
| 2010/0023621 | A1* | 1/2010 | Ezolt | H04L 61/4511 |
| | | | | 709/241 |
| 2010/0153558 | A1* | 6/2010 | Kommula | H04L 61/4511 |
| | | | | 718/105 |
| 2010/0223621 | A1* | 9/2010 | Joshi | H04L 61/4511 |
| | | | | 709/245 |
| 2012/0203864 | A1* | 8/2012 | Toth | H04N 21/2393 |
| | | | | 709/217 |
| 2012/0303784 | A1* | 11/2012 | Zisapel | H04L 67/101 |
| | | | | 709/223 |
| 2013/0219020 | A1* | 8/2013 | McCarthy | H04L 67/1012 |
| | | | | 709/218 |
| 2014/0081466 | A1* | 3/2014 | Huapeng | H04L 12/2825 |
| | | | | 700/276 |
| 2014/0195692 | A1* | 7/2014 | Treuhaft | H04L 61/35 |
| | | | | 709/229 |
| 2015/0046594 | A1* | 2/2015 | Newton | H04L 47/808 |
| | | | | 709/226 |
| 2015/0288647 | A1* | 10/2015 | Chhabra | H04L 61/4552 |
| | | | | 709/245 |
| 2016/0043990 | A1* | 2/2016 | Kagan | H04L 61/4511 |
| | | | | 709/223 |
| 2017/0235763 | A1* | 8/2017 | Gopalapura Venkatesh | |
| | | | | G06F 3/065 |
| | | | | 718/1 |
| 2019/0036825 | A1* | 1/2019 | Seed | H04L 67/12 |
| 2021/0258380 | A1* | 8/2021 | Sunshine | H04L 67/02 |
| 2022/0182354 | A1* | 6/2022 | Fayed | H04L 61/5007 |
| 2022/0217176 | A1* | 7/2022 | Holloway | H04L 63/1458 |
| 2024/0121265 | A1* | 4/2024 | Holloway | H04L 63/1466 |

FOREIGN PATENT DOCUMENTS

| | | |
|---|---|---|
| CN | 105306621 A | 2/2016 |
| CN | 106612308 A | 5/2017 |
| CN | 110299969 A | 10/2019 |
| CN | 111698341 A | 9/2020 |
| CN | 113259490 A | 8/2021 |
| CN | 115242731 A | 10/2022 |
| CN | 115604282 A | 1/2023 |
| CN | 116074282 A | 5/2023 |
| WO | WO 2021/135755 A1 | 7/2021 |

OTHER PUBLICATIONS

Borkar, Gautam M., M. A. Pund, and Prashant Jawade. "Implementation of round robin policy in DNS for thresholding of distributed web server system." Proceedings of the International Conference & Workshop on Emerging Trends in Technology. 2011.*

Kosek, Mike, et al. "Measuring DNS over TCP in the Era of increasing DNS Response Sizes: A View from the Edge." ACM SIGCOMM Computer Communication Review 52.2 (2022): 44-55.*

Dikshit, Pratyush, et al. "Evaluating DNS Resiliency and Responsiveness with Truncation, Fragmentation & DoTCP Fallback." IEEE Transactions on Network and Service Management (2024).*

Abdulhameed, Fahd Ahmed Abdulrahman. Dynamic round-robin peer-to-peer (P2P) domain name system (DNS). MS thesis. King Fahd University of Petroleum and Minerals (Saudi Arabia), 2010.*

Van Rijswijk-Deij, Roland, et al. "A high-performance, scalable infrastructure for large-scale active DNS measurements." IEEE journal on selected areas in communications 34.6 (2016): 1877-1888.*

Janbeglou, Maziar, Habib Naderi, and Nevil Brownlee. "Effectiveness of DNS-based security approaches in large-scale networks." 2014 28th International Conference on Advanced Information Networking and Applications Workshops. IEEE, 2014.*

Tani, Hicham Gibet, and Chaker El Amrani. "Smarter round robin scheduling algorithm for cloud computing and big data." Journal of Data Mining and Digital Humanities (2018).*

Arifin, Samsul, et al. "MQTT Broker Optimization: Comparative Analysis of Round Robin and Least Response Time." Jurnal Nasional Teknik Elektro (2024): 127-136.*

International Patent Application No. PCT/CN2024/071802; Int'l Written Opinion and Search Report; dated Mar. 27, 2024; 6 pages.

"DNS constraints and behaviors"; Amazon Web Services; © 2025; 2 pages.

"DNS query and reply packets are explained in detail"; Li Feng; © 2019; 3 pages.

China Patent Application No. 202310087687.6; Office Action; dated Mar. 28, 2025; 20 pages.

European Patent Application No. 24744156.1; Extended Search Report; dated Nov. 18, 2025; 12 pages.

"Welcome to Knot DNS's documentation!"; https://web.archive.org/web/20221220160018/https://www.knot-dns.cz/docs/3.0/singlehtml/; Dec. 2022; accessed Nov. 7, 2025; 139 pages.

Esibov et al.; "Multicast DNS"; DNSEXT Work Group; Internet Draft; Microsoft; Jul. 2001; 15 pages.

"Overview of the DNS cache feature"; https://my.15.com/manage/s/article/K34350074; F5; @2025; accessed Nov. 7, 2025; 5 pages.

"DNS RRset round-robin"; https://web.archive.org/web/20221005010813/https://github.com/pi-hole/FTL/issues/737; GitHub; Oct. 2022; accessed Nov. 7, 2025; 7 pages.

* cited by examiner

METHOD, ELECTRONIC DEVICE, AND STORAGE MEDIUM FOR PERFORMING A RESPONSE PROCESS BASED ON RESPONSE MESSAGES

CROSS-REFERENCE TO RELATED APPLICATIONS

This application is a continuation of International Application No. PCT/CN2024/071802, filed on Jan. 11, 2024, which claims priority to Chinese patent application No. 202310087687.6 filed with the Chinese Patent Office on Jan. 17, 2023, and entitled "DATA MESSAGE RESPONSE METHOD AND APPARATUS, ELECTRONIC DEVICE AND STORAGE MEDIUM". The disclosure of each of these applications is hereby incorporated by reference into the present application in its entirety.

TECHNICAL FIELD

The present application relates to the field of data processing technologies and, in particular, to a method and an apparatus for data message response, an electronic device, and a storage medium.

BACKGROUND

A data volume of a data message corresponding to a user request may exceed a maximum amount (for example, 512 bytes) that can be processed by a domain name system at a time. In this case, if the corresponding data message has a relatively large volume, truncation processing is performed, or the client is caused to re-initiate a request in a format suitable for a large data volume.

SUMMARY

In view of this, the present application aims to provide a method and an apparatus for data message response, an electronic device, and a storage medium to solve or partially solve the above technical problems.

Based on the above objective, a first aspect of the present application provides a method for data message response. The method includes the steps below.

Request information is received, and a plurality of response messages corresponding to the request information are searched for.

A response process is performed according to the plurality of response messages. The response process includes the steps below.

It is determined whether a data volume of the plurality of response messages is greater than a first threshold.

In response to determining that the data volume of the plurality of response messages is greater than the first threshold, a first predetermined number of target response messages are selected from the plurality of response messages in a round-robin manner for response using a round-robin algorithm, where the first predetermined number is less than a total number of the plurality of response messages.

Based on the same concept, a second aspect of the present application provides an apparatus for data message response. The apparatus includes a receiving module and a response module.

The receiving module is configured to receive request information and search for a plurality of response messages corresponding to the request information.

The response module is configured to perform a response process according to the plurality of response messages. The response process includes: determining whether a data volume of the plurality of response messages is greater than a first threshold; and in response to determining that the data volume of the plurality of response messages is greater than the first threshold, selecting a first predetermined number of target response messages from the plurality of response messages in a round-robin manner for response using a round-robin algorithm, where the first predetermined number is less than a total number of the plurality of response messages.

Based on the same concept, a third aspect of the present application provides an electronic device. The electronic device includes a memory, a processor, and a computer program stored in the memory and executable on the processor. The processor, when executing the program, performs the method according to the first aspect.

Based on the same concept, a fourth aspect of the present application provides a non-transitory computer-readable storage medium storing computer instructions. The computer instructions are used to cause a computer to perform the method according to the first aspect.

BRIEF DESCRIPTION OF THE DRAWINGS

In order to more clearly describe the technical solutions in the present application or in the related art, the drawings required in the description of the embodiments or the related art will be briefly described below. Obviously, the drawings described in the following are only for the embodiments of the present application, and those skilled in the art can obtain other drawings based on these drawings without creative efforts.

DETAILED DESCRIPTION OF EMBODIMENTS

Figure 1:
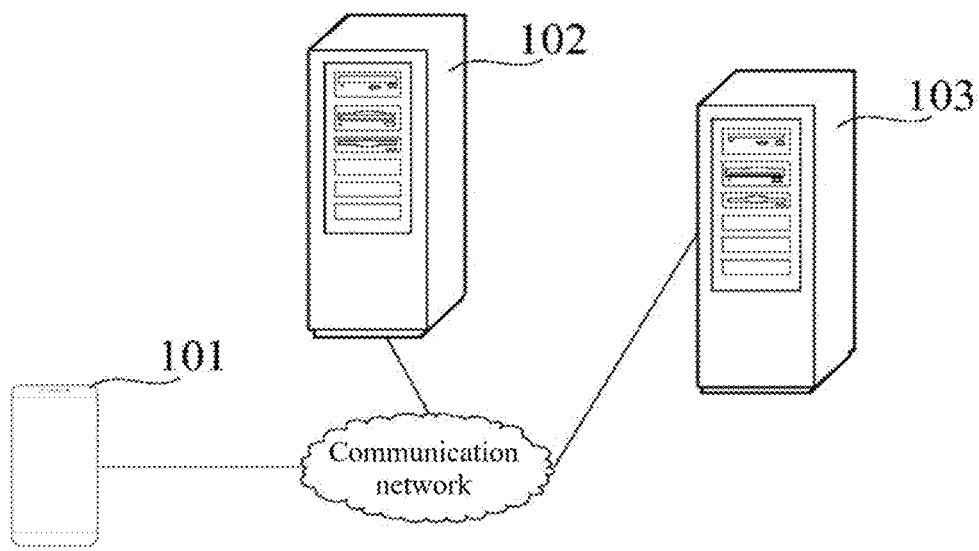
FIG. 1 is a schematic diagram of an application scenario according to an embodiment of the present application.

It should be understood that the data involved in the technical solutions of the present application (including but not limited to the data itself, the acquisition or use of the data) should comply with the requirements of corresponding laws, regulations and related provisions.

The principles and spirit of the present application will be described below with reference to several exemplary implementations. It should be understood that these implementations are only provided for those skilled in the art to better understand and implement the present application, and are not intended to limit the scope of the present application in any way. On the contrary, these implementations are provided to make the present application more thorough and complete, and to fully convey the scope of the present application to those skilled in the art.

It should be understood that before using the technical solutions of the embodiments of the present disclosure, the user will be informed of the type, scope of use, use scenario, etc. of the involved personal information in an appropriate manner, and the user's authorization will be obtained.

For example, in response to receiving an active request from a user, prompt information is sent to the user to clearly inform the user that the operation requested to be performed will require the acquisition and use of the user's personal information. Therefore, the user can independently choose whether to provide personal information to software or hardware such as an electronic device, an application, a server, or a storage medium that performs the operation of the technical solution of the present disclosure according to the prompt information.

As an optional but not limiting implementation, in response to receiving an active request from a user, the prompt information may be sent to the user in the form of a pop-up window, for example, and the prompt information may be presented in text in the pop-up window. In addition, the pop-up window may also carry a selection control for the user to choose whether to "agree" or "disagree" to provide personal information to the electronic device.

It should be understood that the above process of notifying and acquiring user authorization is only illustrative and does not limit the implementations of the present disclosure. Other methods that meet relevant laws and regulations may also be applied to the implementations of the present disclosure.

In this document, it should be understood that any element quantity in the drawings is illustrative rather than restrictive, and any name is only used for differentiation without any restrictive meaning.

Based on the description of the above background art, the following situation exists in the related art. DNS (Domain Name System) query/DNS parse: a standard protocol for mapping a domain name to an IP (Internet Protocol) address.

In a DNS query, a UDP (User Datagram Protocol) protocol is generally used as a default query protocol, but the UDP-based DNS defines a maximum length of a DNS packet as 512 bytes. In a specific scenario, some DNS response data may be greater than 512 bytes. For example, it is expected to parse 100 IP addresses corresponding to a certain domain name, and each IP is expected to carry some traffic.

In this case, a common practice is that a DNS server does not directly respond to a query packet, but sets truncated for a response packet. After receiving such a response packet, a client re-initiates a DNS query through TCP (Transmission Control Protocol). The TCP-based DNS query can break the limit of 512 bytes.

However, this manner has several defects:
1. The efficiency of the TCP-based DNS query is relatively low, and in the above scenario, two queries are actually performed.
2. Some DNS servers/clients do not support TCP well. When it is found that a response exceeds 512 bytes, it is likely that the TCP-based query cannot be initiated/received. This will lead to a failure to parse.

In addition, there is an extension protocol of EDNS0 (Extension mechanism of DNS), which allows 4096 bytes to be returned. However, this length is still limited, and many DNS devices in the Internet do not support this protocol, which will lead to a failure in protocol parse and a failure to respond to a corresponding request.

Explanation of Professional Terms:
Authoritative DNS:

An authoritative DNS is a server that parses a domain name with authorization from a higher level, and at the same time, it can delegate the authorization of the parsing to others. For example, a com top-level server can authorize an authoritative server of the domain name bytedns.com to be ns.bytedns.com, and at the same time, ns.bytedns.com can also delegate the authorization of the subdomain name a.bytedns.com to ns.bbb.com, so that ns.bbb.com becomes an actual authoritative server of a.bytedns.com. The final source of a domain name parse result is usually an authoritative DNS.

Recursive DNS:

It is responsible for accepting a user's query for any domain name and returning a result to the user. The recursive DNS can cache the result to avoid repeated upward queries. This type of DNS is the most frequently used by users. It provides services to the public and is generally provided by network operators. The recursive DNS can be used only with a reliable Internet connection. For example, Google's 8.8.8.8 and 8.8.4.4, and 114's 114.114.114.114 and 114.114.115.115 all belong to this type of DNS. The DNS configured on a local computer is this type of DNS.

A data volume of a data message corresponding to a user request may exceed a maximum amount (for example, 512 bytes) that can be processed by a domain name system at a time. In this case, if the corresponding data message has a relatively large volume, truncation processing is performed, or the client is caused to re-initiate a request in a format suitable for a large data volume.

However, the request query efficiency of this manner is relatively low. In addition, some domain name systems cannot respond to requests in a format suitable for a large data volume, resulting in a response failure, which brings inconvenience to users.

In the method and apparatus for data message response, the electronic device and the storage medium provided in the present application, if the data volume of the response messages searched according to the received request information is greater than the first threshold, it means that the data volume of the response messages is relatively large, and the round-robin algorithm needs to be used to select the first predetermined number of target response messages from these response messages in a round-robin manner for response processing. In this way, when the data volume of the response messages is relatively large, the truncation processing does not need to be performed on the response messages, but the round-robin selection manner is used for response processing, which can ensure that each of the response messages has the same probability of being selected, thereby ensuring the response efficiency of the response messages.

Based on the above situation, the principles and spirit of the present application will be described in detail below with reference to some representative implementations of the present application.

Reference is made to FIG. 1, which is a schematic diagram of an application scenario of a method for data message response provided by an embodiment of the present application. The application scenario includes a terminal device 101, a server 102, and a data storage system 103. The terminal device 101, the server 102, and the data storage system 103 can all be connected through a wired or wireless communication network. The terminal device 101 includes, but is not limited to, a desktop computer, a mobile phone, a mobile computer, a tablet computer, a media player, a smart wearable device, a personal digital assistant (PDA), or other electronic devices that can implement the above functions. Both the server 102 and the data storage system 103 may be independent physical servers, a server cluster or distributed system composed of a plurality of physical servers, or cloud servers that provide basic cloud computing services such as cloud services, cloud databases, cloud computing, cloud functions, cloud storage, network services, cloud communication, middleware services, domain name services, security services, CDN (Content Delivery Network), and big data and artificial intelligence platforms.

The terminal device 101 initiates request information through a client and sends the request information to the server 102. After receiving the request information, the server 102 searches for a plurality of response messages corresponding to the request information (each response message corresponds to an IP address). The server 102 may determine a total data volume of the plurality of response messages, and if the total data volume is greater than a first threshold (for example, 512 bytes), the round-robin algorithm is performed on the plurality of response messages to select a first predetermined number of target response messages from the plurality of response messages for response, and data corresponding to the response is sent to a corresponding client in the terminal device 101 for display. The data storage system 103 is configured to store program codes that need to be executed by the server 102 and store response messages corresponding to various pieces of request information for query.

The method for data message response according to the exemplary implementations of the present application will be described below with reference to the application scenario in FIG. 1. It should be noted that the above application scenario is only shown to facilitate the understanding of the spirit and principles of the present application, and the implementations of the present application are not limited in this respect. On the contrary, the implementations of the present application may be applied to any applicable scenario.

An embodiment of the present application provides a method for data message response. The method is applied to a server.

Figure 2A:
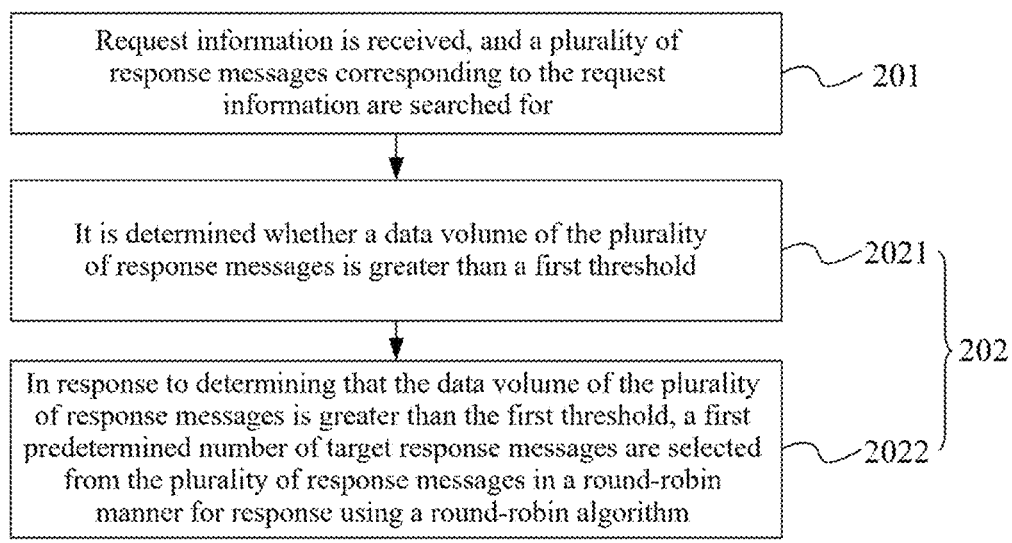
FIG. 2A is a flowchart of a method for data message response according to an embodiment of the present application.

As shown in FIG. 2A, the method includes the steps below.

In step 201, request information is received, and a plurality of response messages corresponding to the request information are searched for.

In an implementation, the corresponding request information is a data request initiated by a user through a client installed on a terminal device according to the user's needs, for example, at least one of a query request, a call request, a search request, an operation processing request, etc.

After receiving the corresponding request information, the server analyzes the request information and determines a plurality of corresponding response messages that satisfy the request information, where each response message corresponds to one response IP.

In step 202, a response process is performed according to the plurality of response messages. The response process includes the steps below.

In step 2021, it is determined whether a data volume of the plurality of response messages is greater than a first threshold.

In step 2022, in response to determining that the data volume of the plurality of response messages is greater than the first threshold, a first predetermined number of target response messages are selected from the plurality of response messages in a round-robin manner for response using a round-robin algorithm, where the first predetermined number is less than a total number of the plurality of response messages.

In an implementation, the first threshold may be selected and set according to actual needs, and is preferably 512 bytes in this embodiment. The data volume of the plurality of response messages refers to a total number of bytes of the plurality of response messages.

If the total number of bytes of the response messages is less than or equal to the first threshold, the server may continue to perform a query response in a UDP format without round-robin algorithm processing. If the total number of bytes of the response messages is greater than the first threshold, at this time, the query response cannot be directly performed in the UDP format, and the round-robin algorithm needs to be used to select the first predetermined number of target response messages from the plurality of response messages in a round-robin manner, and then the query response continues to be performed in the UDP format, without a truncation processing manner or other unfriendly formats (for example, TCP or EDNS0) thereby ensuring the stability of a response effect.

With the above solution, when the data volume of the response messages is relatively large, the truncation processing does not need to be performed on the response messages, but the round-robin selection manner is used for response processing, which can ensure that each of the response messages has the same probability of being selected, thereby ensuring the response efficiency of the response messages.

In some embodiments, before step 202 is executed, a process of determining the first predetermined number includes the steps below.

In step A1, in response to determining that the data volume of the plurality of response messages is greater than the first threshold, a process of reducing the number of the plurality of response messages by a second predetermined number is repeatedly performed until it is determined that a data volume of remaining response messages is less than or equal to the first threshold.

The corresponding second predetermined number may be a fixed value, may be a value that decreases or increases sequentially, may be a value that first decreases sequentially and then increases sequentially, or may be a value that first increases sequentially and then decreases sequentially. The second predetermined number in this embodiment is preferably a fixed value one.

In step A2, the number of the remaining response messages is determined as the first predetermined number. With the above solution, the first predetermined number that satisfies being less than or equal to the first threshold can be accurately determined, thereby ensuring that when the round-robin selection is performed using the round-robin algorithm, the data volume of the first predetermined number of target response messages selected in each round-robin selection is less than or equal to the first threshold, so that the target response messages selected in each round-robin selection can be used to perform a query response in the UDP format, thereby effectively improving the response efficiency.

Figure 2B:
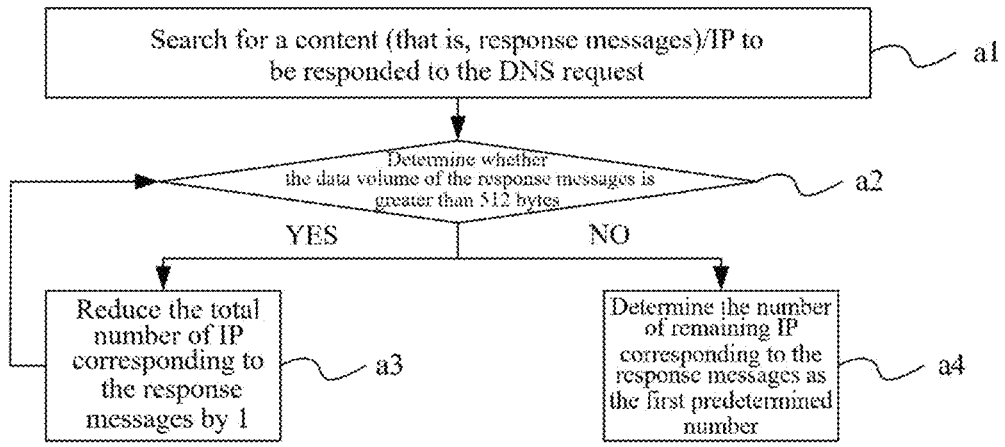
FIG. 2B is an example diagram of determining a first predetermined number according to an embodiment of the present application.

For example, as shown in FIG. 2B, for the request information being a DNS request, a process of determining the first predetermined number includes the steps below.

In step a1, a content (that is, response messages)/IP that should be responded to the DNS request is searched for.

In step a2, it is determined whether the data volume of the response messages is greater than 512 bytes. If yes, the process proceeds to step a3. Otherwise, the process proceeds to step a4.

In step a3, the total number of IPs corresponding to the response messages is reduced by 1, and the process returns to step a2.

In step a4, the number of remaining IPs corresponding to the response messages is determined as the first predetermined number (that is, C).

In some embodiments, in step 2022, the selecting the first predetermined number of target response messages from the plurality of response messages in the round-robin manner for response using the round-robin algorithm includes the steps below.

In step 20221, the total number M of the plurality of response messages is determined, and the M response messages are sorted in sequence.

In an implementation, since each response message corresponds to one IP address, the sorting order may be an ascending order or a descending order of the IP addresses, and the sequence numbers are sequentially assigned starting from 0 after sorting.

In step 20222, a current number N of requests of the request information is determined, and response messages in a sorting interval from (N−1) % M to (N−1+C−1) % M are selected from the M response messages in a round-robin manner and used as the target response messages for response using the round-robin algorithm, where % represents a remainder operation, and C represents the first predetermined number.

The number of requests refers to the number of times a same piece of request information is requestedmultiple times.

In an implementation, the C sequential numbers corresponding to the IP addresses corresponding to the current number N of requests are selected according to the algorithm formula of the sorting interval in step 20222, so that the C selected response messages can be used for response. If the selection reaches the end of the sorting in the round-robin manner according to the number of requests, the selection may continue from the head of the sorting according to the algorithm formula of the sorting interval. In this way, the feature of circular connection of each response message is ensured, and at the same time, each response message has the same probability of being selected.

For example, a user configures exampe.com to parse to 100 IP addresses from 10.10.10.1 to 10.10.10.100. Assuming that when a response is found, it is found that as long as more than 10 IPs are exceeded, the data amount of a response data package will exceed 512 bytes. At this time, for each DNS request, the data response is as follows:

the first request, and the response: 10.10.10.1 to 10.10.10.10;

the second request, and the response: 10.10.10.2 to 10.10.10.11;

the third request, and the response: 10.10.10.3 to 10.10.10.12;

the 92nd request, and the response: 10.10.10.92 to 10.10.10.100 and 10.10.10.1;

. . .

the 100th request, and the response: 10.10.10.100 and 10.10.10.1 to 10.10.10.9;and the 101st request, and the response: 10.10.10.1 to 10.10.10.10.

It can be learned from the above example that the DNS query only returns some IPs every time, which prevents the DNS from truncating. Moreover, the objective of load balancing is finally achieved. Each IP has the same probability of being acquired by the client.

In some embodiments, the solutions corresponding to step 201 and step 202 in the above embodiments may be executed in an authoritative domain name system, may be executed in a recursive domain name system, or may be executed in both the authoritative domain name system and the recursive domain name system.

The execution of the response process in the authoritative domain name system will be specifically described below as an embodiment.

Figure 2C:
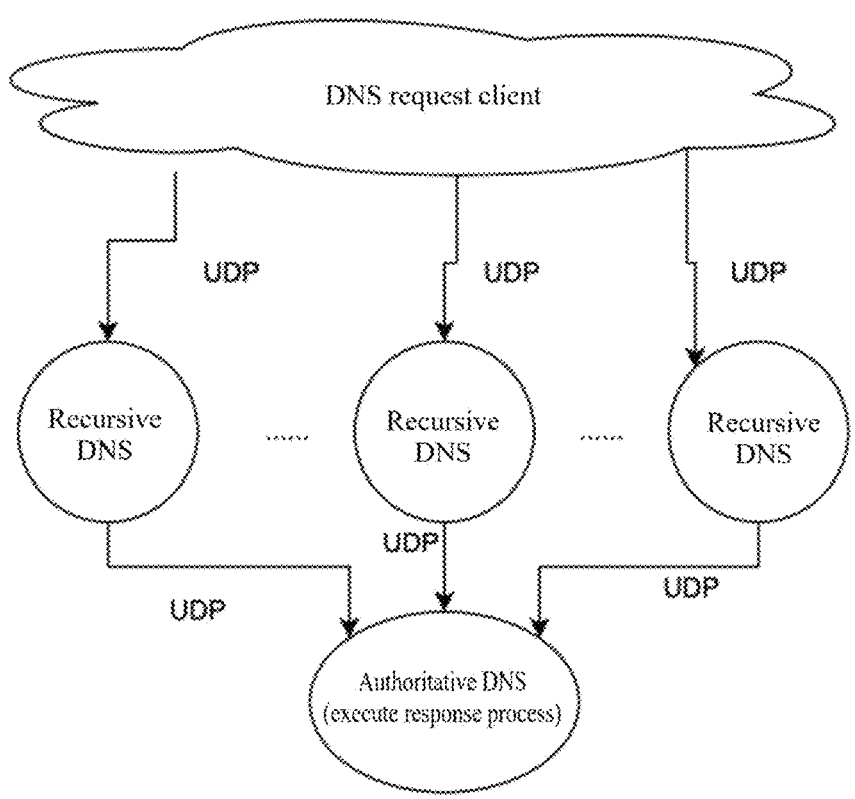
FIG. 2C is an example diagram of performing a response process using an authoritative domain name system according to an embodiment of the present application.

FIG. 2C illustrates an example diagram of performing a response process using an authoritative domain name system.

In step A1, the request information sent by the client through the recursive domain name system is received using the authoritative domain name system.

In some embodiments, step A1 includes the step below.

The request information in the user datagram protocol (UDP) format sent by the recursive domain name system is received using the authoritative domain name system, where the request information in the UDP format is the request information in the UDP format sent by the client to the recursive domain name system.

In an implementation, after generating the corresponding request information (that is, a DNS request), each client forwards same through the recursive domain name system (that is, the recursive DNS), and the request information is forwarded to the corresponding authoritative domain name system (that is, the authoritative DNS) for the processing of the response process by the authoritative domain name system.

In the above process, the recursive domain name system performs a centralized distribution process on the UDP format DNS requests sent by the clients, and the UDP format DNS requests are converted into the UDP format request information after conversion, and the UDP format request information after conversion is distributed to the corresponding authoritative domain name system. At least one corresponding recursive domain name system may be provided, and the authoritative domain name system receives the converted UDP format request information sent by the respective recursive domain name systems. The subsequent authoritative domain name system is used to perform the processing of the response process on each UDP format request information.

In step A2, the plurality of response messages corresponding to the request information are searched for using the authoritative domain name system.

Step 202 is also performed using the authoritative domain name system. The specific execution process is the same as the specific solution of step 202, which will not be repeated here.

In an implementation, since the recursive DNS side processes the request information in the UDP format, when the authoritative DNS side uses the response process of this embodiment, the request information may also be processed in the UDP format on the authoritative DNS side. In this way, for the parse of the entire network response process may be performed using the UDP. Since the data processing speed of the UDP format is relatively fast, the speed and efficiency of the request response of the entire network can be improved. For the recursive DNS, each recursive DNS may obtain some IPs of the response messages corresponding to the DNS requests sent by all clients. Moreover, since each recursive DNS requests an authoritative DNS separately to obtain a parse result, the results of each recursive DNS are just round-robin, and the obtained results are different.

The final effect is that even if corresponding IPs/nodes to 1000 response messages are configured for the request information to provide online services, each IP may also evenly provide traffic to achieve global load balancing. The involvement of TCP or other complex protocols is not required, and the DNS with the full-link UDP may meet the requirement.

The execution of the response process in the recursive domain name system and the authoritative domain name system will be specifically described below as an embodiment.

In step B1, the request information sent by the client is received using the recursive domain name system, and the plurality of response messages corresponding to the request information are searched for using the recursive domain name system.

In an implementation, after generating the corresponding request information (that is, a DNS request), each client sends the request information to the recursive domain name system, and the recursive domain name system determines the corresponding response messages according to the request information.

In step B2, the response process of the plurality of response messages is performed using the recursive domain name system, the response result information is generated according to the response process, and the response result information is sent to the authoritative domain name system.

In an implementation, if the number of the found response messages corresponding to the request information sent by the client to the recursive domain name system is relatively large, the recursive domain name system cannot complete the response process using a UDP format file, and the corresponding response process may be performed using the round-robin algorithm on the recursive domain name system side according to the solution of step 202, so that the response process may be completed using the UDP format file. The specific execution process is the same as the above, which will not be repeated here.

After the execution is completed, the UDP format response result information is obtained, and the UDP format response result information is sent to the authoritative domain name system to perform the parsing process according to the response messages in the response result information.

In step B3, the response result information sent by the recursive domain name system is received using the authoritative domain name system.

In step B4, the plurality of response messages corresponding to the response result information are searched for using the authoritative domain name system.

In step B5, the response process of the plurality of response messages corresponding to the response result information is performed using the authoritative domain name system.

In an implementation, for the received UDP format response result information on the authoritative domain name system side, if the data volume is relatively large, the response process performed using the round-robin algorithm in step 202 may continue to be used to continue to complete the response processing of the plurality of response messages in the response result information. The specific execution process is the same as the above step 202, which will not be repeated here.

With the above solution, the response process performed using the corresponding round-robin algorithm may be executed on the recursive domain name system side and the authoritative domain name system side at the same time, which can ensure the rate and effect of the response processing process on the recursive domain name system side and the authoritative domain name system side. In this way, when the response message processing is performed for the entire network, the UDP format may be used for all the response message processing. The response message processing speed of the UDP format is fast and the response accuracy is high, thereby improving the effect of the response of the entire network.

The execution of the response process in the recursive domain name system will be specifically described below as an embodiment.

Figure 2D:
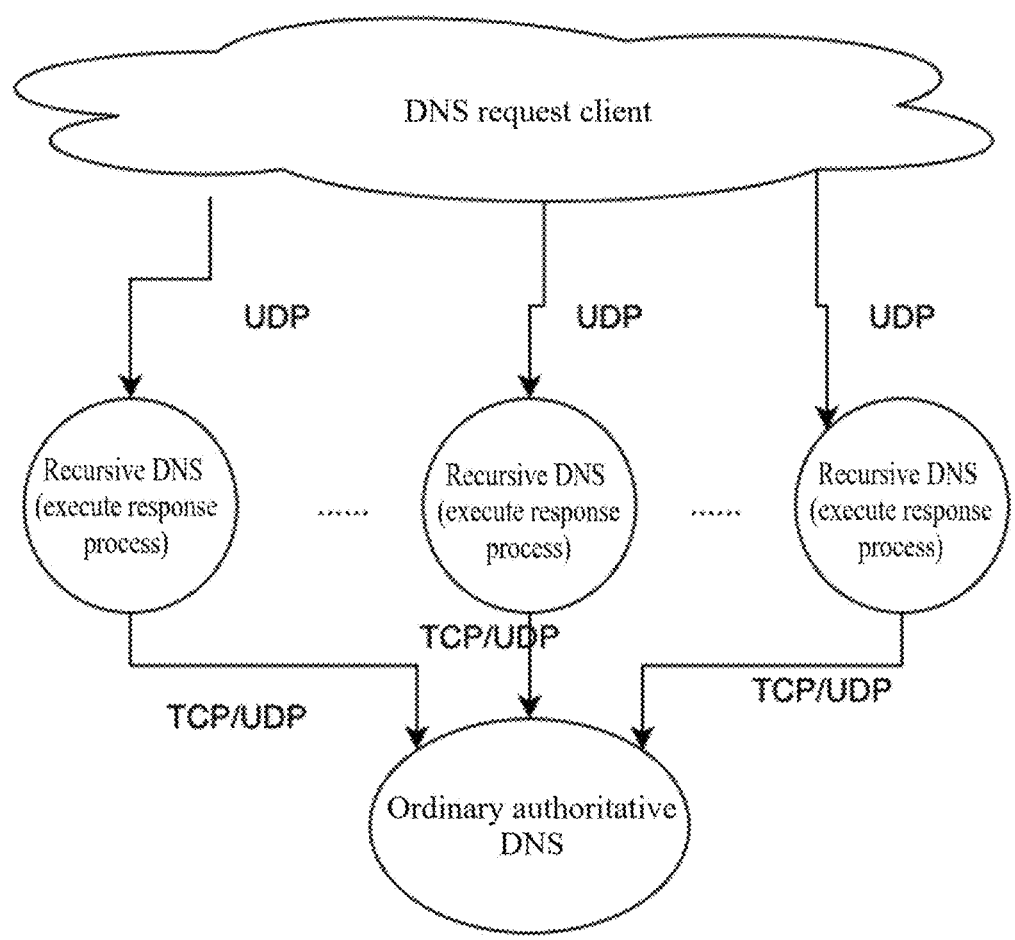
FIG. 2D is an example diagram of performing a response process using a recursive domain name system according to an embodiment of the present application.

FIG. 2D illustrates an example diagram of performing a response process using a recursive domain name system.

In step C1, the request information sent by the client is received using the recursive domain name system, and the plurality of response messages corresponding to the request information are searched for using the recursive domain name system.

In an implementation, after generating the corresponding request information, each client sends the request information to the recursive domain name system, and the recursive domain name system determines the corresponding response messages according to DNS requests in the UDP format sent by each of the clients.

In step C2, the response process of the plurality of response messages is performed using the recursive domain name system.

In an implementation, if the number of the found response messages corresponding to the request information sent by the client to the recursive domain name system is relatively large, the recursive domain name system cannot complete the response process using a UDP format file, and the corresponding response process may be performed using the round-robin algorithm on the recursive domain name system side according to the solution of step 202, so that the response process may be completed using the UDP format file. The specific execution process is the same as the above, which will not be repeated here.

In step C3, after the response process is performed using the recursive domain name system, the response result information is generated according to the response process, and the response result information is sent to the authoritative domain name system, so that the authoritative domain name system performs response according to the response result information.

In some embodiments, in step C3, the sending the response result information to the authoritative domain name system includes the step below.

The response result information is sent to the authoritative domain name system in a user datagram protocol (UDP) format or a transmission control protocol (TCP) format.

In an implementation, if the data volume of the response result information corresponding to various pieces of request information obtained after the execution is completed by the recursive domain name system is relatively small (less than or equal to 512 bytes), the response result information may be sent to the authoritative domain name system in the UDP format, and if the data volume is relatively large (greater than 512 bytes), the response result information needs to be sent to the authoritative domain name system in the TCP format. The authoritative domain name system is used to parse the corresponding result information to make response, and then the parsed result is returned to the client through the recursive domain name system, so that the client can obtain the request result.

In the above solution, when the response process of the round-robin algorithm of this embodiment is implemented on the recursive DNS side, the requests of the client may be performed in the UDP, and the recursive DNS to the authoritative DNS side is performed according to a standard DNS protocol. Since the recursive DNS has a caching function, most of the DNS requests in the entire network are from the client to the recursive DNS. Therefore, the response process of the round-robin algorithm is performed on the recursive DNS side in this embodiment, which can significantly improve the efficiency of the DNS request.

For example, a TTL (Time To Live) of a certain domain name is configured to be 60 s. The number of requests of the domain name from the client to the recursive DNS is about 60:1 compared with the number of requests from the recursive DNS to the authoritative DNS, thereby improving the efficiency of the DNS query.

Since the recursive DNS may perform the response process of the round-robin algorithm and there are a large number of IPs that need to be parsed, the client actually has the same probability of acquiring each IP.

It should be noted that in this implementation method, the recursive DNS must support a TCP truncation prevention function, that is, support a TCP-based DNS query.

In conclusion, in the present application, the problem of low transmission efficiency of the TCP after the UDP is truncated is solved without introducing a complex method. Moreover, the problem that some DNS devices in the Internet do not support the TCP query/EDNS0 is solved. In addition, for a scheduling system (recursive DNS and/or authoritative DNS) in a CDN (Content Delivery Network) scenario of the Internet, the scheduling system may not be affected by IP truncation, and the scheduling system only needs to determine available IPs and distinguish the routes of the IPs. The recursive DNS and/or the authoritative DNS implementing the solution of the present application may reduce the complexity of implementing the response process, and significantly reduce failures of the DNS query caused by truncation.

It should be noted that the method of the embodiment of the present application may be executed by a single device, such as a computer or a server. The method of the embodiment may also be applied to a distributed scenario, and multiple devices cooperate with each other to complete the method. In this distributed scenario, one of the multiple devices may only execute one or more steps of the method of the embodiment of the present application, and the multiple devices may interact with each other to complete the method.

It should be noted that some embodiments of the present application have been described above. Other embodiments are within the scope of the appended claims. In some cases, the actions or steps recited in the claims may be performed in a different order than in the above embodiments and still achieve desired results.

In addition, the processes depicted in the drawings do not necessarily require the specific order shown or a continuous order to achieve desired results. In some implementations, multitasking and parallel processing are also possible or may be advantageous.

Based on the same concept, corresponding to the method for data message response according to any of the above embodiments, the present application further provides an apparatus for data message response.

Figure 3:
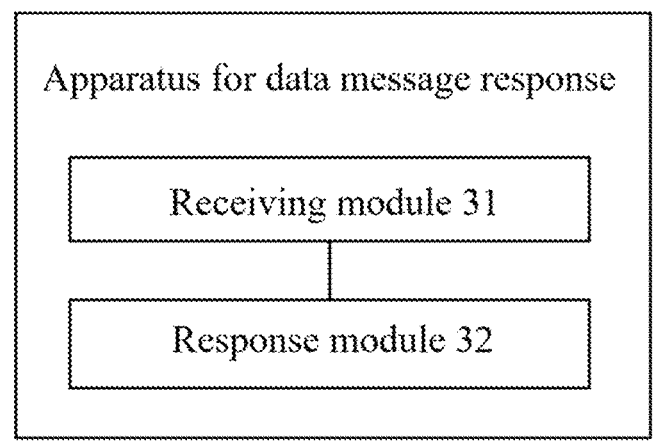
FIG. 3 is a block diagram of a structure of an apparatus for data message response according to an embodiment of the present application.

Referring to FIG. 3, the apparatus includes a receiving module and a response module.

The receiving module is configured to receive request information and search for a plurality of response messages corresponding to the request information.

The response module is configured to perform a response process according to the plurality of response messages. The response process includes: determining whether a data volume of the plurality of response messages is greater than a first threshold; and in response to determining that the data volume of the plurality of response messages is greater than the first threshold, selecting a first predetermined number of target response messages from the plurality of response messages in a round-robin manner for response using a round-robin algorithm, where the first predetermined number is less than a total number of the plurality of response messages.

In some embodiments, the apparatus further includes a number determination module.

The number determination module is configured to: in response to determining that the data volume of the plurality of response messages is greater than the first threshold, repeatedly perform a process of reducing the number of the plurality of response messages by a second predetermined number until it is determined that a data volume of remaining response messages is less than or equal to the first threshold; and determine a number of the remaining response messages as the first predetermined number.

In some embodiments, the response module includes a sorting unit and a response unit.

The sorting unit is configured to determine a total number M of the plurality of response messages, and sort the M response messages in sequence.

The response unit is configured to determine a current number N of requests of the request information, and select, using the round-robin algorithm, response messages in a sorting interval from (N−1) % M to (N−1+C−1) % M from the M response messages as the target response messages for response, where % represents a remainder operation, and C represents the first predetermined number.

In some embodiments, the receiving module is further configured to:

receive, using an authoritative domain name system, the request information sent by the client through the recursive domain name system; and search, using the authoritative domain name system, for the plurality of response messages corresponding to the request information;

where the response module is provided in the authoritative domain name system and the response process of the plurality of response messages is performed using the authoritative domain name system.

In some embodiments, the receiving module is further configured to:

receive, using the authoritative domain name system, the request information in a user datagram protocol (UDP) format sent by the recursive domain name system, where the request information in the UDP format is the request information sent by the client to the recursive domain name system in the UDP format.

In some embodiments, the receiving module is further configured to:

receive, using the recursive domain name system, the request information sent by the client, and search, using the recursive domain name system, for the plurality of response messages corresponding to the request information.

The response module is provided in the recursive domain name system and the response module is configured to perform, using the recursive domain name system, the response process of the plurality of response messages, generate response result information according to the response process, and send the response result information to the authoritative domain name system.

The receiving module is further configured to: receive, using the authoritative domain name system, the response result information sent by the recursive domain name system.

The response module is provided in the recursive domain name system and the response module is configured to search, using the authoritative domain name system, for the plurality of response messages corresponding to the response result information; and perform, using the authoritative domain name system, the response process of the plurality of response messages corresponding to the response result information.

In some embodiments, the receiving module is further configured to:

receive, using the recursive domain name system, the request information sent by the client, and search, using the recursive domain name system, for the plurality of response messages corresponding to the request information.

The response module is provided in the recursive domain name system and the response module is further configured to:

after the response process is performed using the recursive domain name system, generate the response result information according to the response process, and send the response result information to the authoritative domain name system, so that the authoritative domain name system performs response according to the response result information.

In some embodiments, the response module is further configured to: send the response result information to the authoritative domain name system in a user datagram protocol (UDP) format or a transmission control protocol (TCP) format.

For the convenience of description, the above apparatus is described as various modules according to functions. Certainly, when the present application is implemented, the functions of the modules may be implemented in one or more pieces of software and/or hardware.

The apparatus of the above embodiment is configured to implement the corresponding method in any of the above embodiments, and has the beneficial effects of the corresponding method embodiment, which will not be repeated here.

Based on the same concept, corresponding to the method of any of the above embodiments, the present application further provides an electronic device. The electronic device includes a memory, a processor, and a computer program stored in the memory and executable on the processor. The processor, when executing the program, performs the method of any of the above embodiments.

Figure 4:
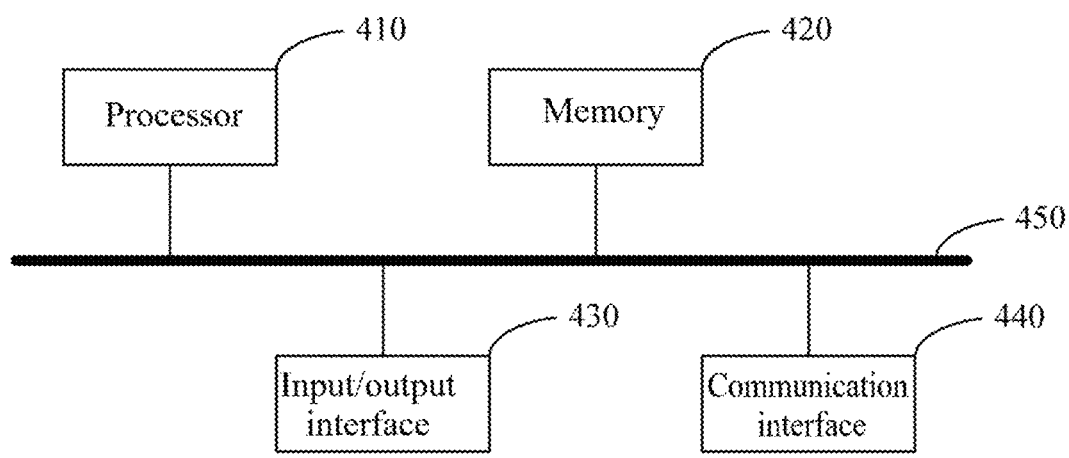
FIG. 4 is a schematic diagram of a structure of an electronic device according to an embodiment of the present application.

FIG. 4 illustrates a more specific schematic diagram of a hardware structure of an electronic device provided by this embodiment. The device may include: a processor 410, a memory 420, an input/output interface 430, a communication interface 440, and a bus 450. The processor 410, the memory 420, the input/output interface 430, and the communication interface 440 implement communication connection between each other inside the device through the bus 450.

The processor 410 may be implemented by means of a general-purpose CPU (Central Processing Unit), a microprocessor, an application specific integrated circuit (Application Specific Integrated Circuit, ASIC), or one or more integrated circuits, and is configured to execute related programs to implement the technical solutions provided by the embodiments of the present specification.

The memory 420 may be implemented in the form of a ROM (Read Only Memory), a RAM (Random Access Memory), a static storage device, a dynamic storage device, etc. The memory 420 may store an operating system and other application programs. When the technical solutions provided by the embodiments of the present specification are implemented by means of software or firmware, related program codes are stored in the memory 420 and called by the processor 410 for execution.

The input/output interface 430 is configured to be connected to an input/output module to implement information input and output. The input/output module may be configured in the device as a component (not shown in the figure), or may be connected to the device externally to provide corresponding functions. The input device may include a keyboard, a mouse, a touchscreen, a microphone, various sensors, etc., and the output device may include a display, a speaker, a vibrator, an indicator light, etc.

The communication interface 440 is configured to be connected to a communication module (not shown in the figure) to implement communication interaction between the device and other devices. The communication module may implement communication in a wired manner (for example, a USB, a network cable, etc.), or may implement communication in a wireless manner (for example, a mobile network, WIFI, Bluetooth, etc.).

The bus 450 includes a path for transmitting information between various components of the device (for example, the processor 410, the memory 420, the input/output interface 430, and the communication interface 440).

It should be noted that although the above device only shows the processor 410, the memory 420, the input/output interface 430, the communication interface 440, and the bus 450, in a specific implementation process, the device may further include other components necessary for normal operation. In addition, those skilled in the art can understand that the above device may also include only components necessary for implementing the solutions of the embodiments of the present specification, and not necessarily all components shown in the figure.

The electronic device of the above embodiment is configured to implement the corresponding method for data message response in any of the above embodiments, and has the beneficial effects of the corresponding method for data message response embodiment, which will not be repeated here.

Based on the same concept, corresponding to the method of any of the above embodiments, the present application further provides a non-transitory computer-readable storage medium storing computer instructions. The computer instructions are used to cause a computer to perform the method of any of the above embodiments.

The computer-readable medium of this embodiment includes permanent and non-permanent, and removable and non-removable media, and information storage may be implemented by any method or technology. The information may be computer-readable instructions, a data structure, a program module, or other data. Examples of the storage medium of the computer include, but are not limited to, a phase change memory (PRAM), a static random access memory (SRAM), a dynamic random access memory (DRAM), other types of random access memory (RAM), a read-only memory (ROM), an electrically erasable programmable read-only memory (EEPROM), a flash memory or other memory technology, a compact disc read-only memory (CD-ROM), a digital versatile disc (DVD) or other optical storage, a magnetic cassette tape, a magnetic tape magnetic disk storage, or other magnetic storage devices, or any other non-transmission medium, which may be used to store information that may be accessed by a computing device.

The computer instructions stored in the storage medium of the above embodiment are used to cause the computer to perform the method of any of the above embodiments, and have the beneficial effects of the corresponding method embodiment, which will not be repeated here.

Persons of ordinary skill in the art should understand that the discussion of any of the above embodiments is exemplary, and is not intended to imply that the scope of the present application (including the claims) is limited to these examples. Under the concept of the present application, the technical features in the above embodiments or different embodiments may also be combined, and the steps may be implemented in any order, and there are many other variations in different aspects of the embodiments of the present application as described above, which are not provided in detail for the sake of brevity.

In addition, in order to simplify the description and discussion, and in order not to make the embodiments of the present application difficult to understand, the well-known power/ground connections of integrated circuit (IC) chips and other components may or may not be shown in the drawings provided. In addition, the apparatus may be shown in the form of a block diagram, so as to avoid making the embodiments of the present application difficult to understand, and this also takes into account the fact that the details of the implementations of these block diagrams are highly dependent on the platform on which the embodiments of the present application are to be implemented (that is, these details should be completely within the understanding of those skilled in the art). When specific details (for example, circuits) are described to describe exemplary embodiments of the present application, it is obvious to those skilled in the art that the embodiments of the present application may be implemented without these specific details or with variations of these specific details. Therefore, these descriptions should be considered as illustrative rather than restrictive.

Although the present application has been described in combination with specific embodiments of the present application, many substitutions, modifications, and variations of these embodiments will be obvious to those of ordinary skill in the art based on the preceding description. For example, other memory architectures (for example, dynamic RAM (DRAM)) may use the discussed embodiments.

The embodiments of the present application are intended to cover all such substitutions, modifications, and variations that fall within the broad scope of the appended claims. Therefore, any omission, modification, equivalent substitution, improvement, etc. made within the spirit and principles of the embodiments of the present application shall be included in the protection scope of the present application.

The invention claimed is:

1. A method for performing a response process based on a plurality of response messages, comprising:
   receiving request information and searching for the plurality of response messages corresponding to the request information; and
   performing the response process according to the plurality of response messages, the response process comprising:
   determining whether a data volume of the plurality of response messages is greater than a first threshold; and
   in response to determining that the data volume of the plurality of response messages is greater than the first threshold, selecting a first predetermined number of target response messages from the plurality of response messages in a round-robin manner for response using a round-robin algorithm, wherein the first predetermined number is less than a total number of the plurality of response messages.

2. The method according to claim 1, wherein a process of determining the first predetermined number comprises:
   in response to determining that the data volume of the plurality of response messages is greater than the first threshold, repeatedly performing a process of reducing the number of the plurality of response messages by a second predetermined number until it is determined that a data volume of remaining response messages is less than or equal to the first threshold; and
   determining a number of the remaining response messages as the first predetermined number.

3. The method according to claim 1, wherein the selecting the first predetermined number of target response messages from the plurality of response messages in the round-robin manner for response using the round-robin algorithm comprises:
   determining a total number M of the plurality of response messages, and sorting the M response messages in sequence; and
   determining a current number N of requests of the request information, and selecting, using the round-robin algorithm, response messages in a sorting interval from (N−1) % M to (N−1+C−1) % M from the M response messages in the round-robin manner as the target response messages for response, wherein % represents a remainder operation, and C represents the first predetermined number.

4. The method according to claim 1, wherein the receiving the request information and searching for the plurality of response messages corresponding to the request information comprises:
   receiving, using an authoritative domain name system, the request information sent by a client through a recursive domain name system; and
   searching, using the authoritative domain name system, for the plurality of response messages corresponding to the request information,
   wherein the response process of the plurality of response messages is performed using the authoritative domain name system.

5. The method according to claim 4, wherein the receiving, using the authoritative domain name system, the request information sent by the client through the recursive domain name system comprises:
   receiving, using the authoritative domain name system, the request information in a user datagram protocol (UDP) format sent by the recursive domain name system, wherein the request information in the UDP format is the request information sent by the client to the recursive domain name system in the UDP format.

6. The method according to claim 4, wherein the receiving, using the authoritative domain name system, the request information sent by the client through the recursive domain name system comprises:
receiving, using the recursive domain name system, the request information sent by the client, and searching, using the recursive domain name system, for the plurality of response messages corresponding to the request information;
performing, using the recursive domain name system, the response process of the plurality of response messages, generating response result information according to the response process, and sending the response result information to the authoritative domain name system; and
receiving, using the authoritative domain name system, the response result information sent by the recursive domain name system;
wherein the searching, using the authoritative domain name system, for the plurality of response messages corresponding to the request information comprises:
searching, using the authoritative domain name system, for the plurality of response messages corresponding to the response result information; and
performing, using the authoritative domain name system, the response process of the plurality of response messages corresponding to the response result information.

7. The method according to claim 1, wherein the receiving the request information and searching for the plurality of response messages corresponding to the request information comprises:
receiving, using the recursive domain name system, the request information sent by the client, and searching, using the recursive domain name system, for the plurality of response messages corresponding to the request information;
performing, using the recursive domain name system, the response process of the plurality of response messages; and
after the response process is performed using the recursive domain name system, generating response result information according to the response process, and sending the response result information to the authoritative domain name system, so that the authoritative domain name system performs response according to the response result information.

8. The method according to claim 7, wherein the sending the response result information to the authoritative domain name system comprises:
sending the response result information to the authoritative domain name system in a user datagram protocol (UDP) format or a transmission control protocol (TCP) format.

9. An electronic device, comprising a memory, a processor, and a computer program stored in the memory and executable on the processor, wherein the processor, when executing the program, performs operations comprising:
receiving request information and searching for a plurality of response messages corresponding to the request information; and
performing a response process according to the plurality of response messages, the response process comprising:
determining whether a data volume of the plurality of response messages is greater than a first threshold; and
in response to determining that the data volume of the plurality of response messages is greater than the first threshold, selecting a first predetermined number of target response messages from the plurality of response messages in a round-robin manner for response using a round-robin algorithm, wherein the first predetermined number is less than a total number of the plurality of response messages.

10. A non-transitory computer-readable storage medium storing computer instructions, wherein the computer instructions, when executed by a computing device, cause the computing device to perform operations comprising:
receiving request information and searching for a plurality of response messages corresponding to the request information; and
performing a response process according to the plurality of response messages, the response process comprising:
determining whether a data volume of the plurality of response messages is greater than a first threshold; and
in response to determining that the data volume of the plurality of response messages is greater than the first threshold, selecting a first predetermined number of target response messages from the plurality of response messages in a round-robin manner for response using a round-robin algorithm, wherein the first predetermined number is less than a total number of the plurality of response messages.

11. The electronic device according to claim 9, wherein a process of determining the first predetermined number comprises:
in response to determining that the data volume of the plurality of response messages is greater than the first threshold, repeatedly performing a process of reducing the number of the plurality of response messages by a second predetermined number until it is determined that a data volume of remaining response messages is less than or equal to the first threshold; and
determining a number of the remaining response messages as the first predetermined number.

12. The electric device according to claim 9, wherein the selecting the first predetermined number of target response messages from the plurality of response messages in the round-robin manner for response using the round-robin algorithm comprises:
determining a total number M of the plurality of response messages, and sorting the M response messages in sequence; and
determining a current number N of requests of the request information, and selecting, using the round-robin algorithm, response messages in a sorting interval from (N−1) % M to (N−1+C−1) % M from the M response messages in the round-robin manner as the target response messages for response, wherein % represents a remainder operation, and C represents the first predetermined number.

13. The electronic device according to claim 9, wherein the receiving the request information and searching for the plurality of response messages corresponding to the request information comprises:
receiving, using an authoritative domain name system, the request information sent by a client through a recursive domain name system; and
searching, using the authoritative domain name system, for the plurality of response messages corresponding to the request information, wherein the response process of the plurality of response messages is performed using the authoritative domain name system.

14. The electronic device according to claim 13, wherein the receiving, using the authoritative domain name system, the request information sent by the client through the recursive domain name system comprises:
receiving, using the authoritative domain name system, the request information in a user datagram protocol (UDP) format sent by the recursive domain name system, wherein the request information in the UDP format is the request information sent by the client to the recursive domain name system in the UDP format.

15. The electronic device according to claim 13, wherein the receiving, using the authoritative domain name system, the request information sent by the client through the recursive domain name system comprises:
receiving, using the recursive domain name system, the request information sent by the client, and searching, using the recursive domain name system, for the plurality of response messages corresponding to the request information;
performing, using the recursive domain name system, the response process of the plurality of response messages, generating response result information according to the response process, and sending the response result information to the authoritative domain name system; and
receiving, using the authoritative domain name system, the response result information sent by the recursive domain name system;
wherein the searching, using the authoritative domain name system, for the plurality of response messages corresponding to the request information comprises:
searching, using the authoritative domain name system, for the plurality of response messages corresponding to the response result information; and
performing, using the authoritative domain name system, the response process of the plurality of response messages corresponding to the response result information.

16. The non-transitory computer-readable storage medium according to claim 10, wherein a process of determining the first predetermined number comprises:
in response to determining that the data volume of the plurality of response messages is greater than the first threshold, repeatedly performing a process of reducing the number of the plurality of response messages by a second predetermined number until it is determined that a data volume of remaining response messages is less than or equal to the first threshold; and
determining a number of the remaining response messages as the first predetermined number.

17. The non-transitory computer-readable storage medium according to claim 10, wherein the selecting the first predetermined number of target response messages from the plurality of response messages in the round-robin manner for response using the round-robin algorithm comprises:
determining a total number M of the plurality of response messages, and sorting the M response messages in sequence; and
determining a current number N of requests of the request information, and selecting, using the round-robin algorithm, response messages in a sorting interval from (N−1) % M to (N−1+C−1) % M from the M response messages in the round-robin manner as the target response messages for response, wherein % represents a remainder operation, and C represents the first predetermined number.

18. The non-transitory computer-readable medium according to claim 10, wherein the receiving the request information and searching for the plurality of response messages corresponding to the request information comprises:
receiving, using an authoritative domain name system, the request information sent by a client through a recursive domain name system; and
searching, using the authoritative domain name system, for the plurality of response messages corresponding to the request information, wherein the response process of the plurality of response messages is performed using the authoritative domain name system.

19. The non-transitory computer-readable medium according to claim 18, wherein the receiving, using the authoritative domain name system, the request information sent by the client through the recursive domain name system comprises:
receiving, using the authoritative domain name system, the request information in a user datagram protocol (UDP) format sent by the recursive domain name system, wherein the request information in the UDP format is the request information sent by the client to the recursive domain name system in the UDP format.

20. The non-transitory computer-readable storage medium according to claim 18, wherein the receiving, using the authoritative domain name system, the request information sent by the client through the recursive domain name system comprises:
receiving, using the recursive domain name system, the request information sent by the client, and searching, using the recursive domain name system, for the plurality of response messages corresponding to the request information;
performing, using the recursive domain name system, the response process of the plurality of response messages, generating response result information according to the response process, and sending the response result information to the authoritative domain name system; and
receiving, using the authoritative domain name system, the response result information sent by the recursive domain name system;
wherein the searching, using the authoritative domain name system, for the plurality of response messages corresponding to the request information comprises:
searching, using the authoritative domain name system, for the plurality of response messages corresponding to the response result information; and
performing, using the authoritative domain name system, the response process of the plurality of response messages corresponding to the response result information.

* * * * *